United States Patent Office 2,806,700
Patented Sept. 17, 1957

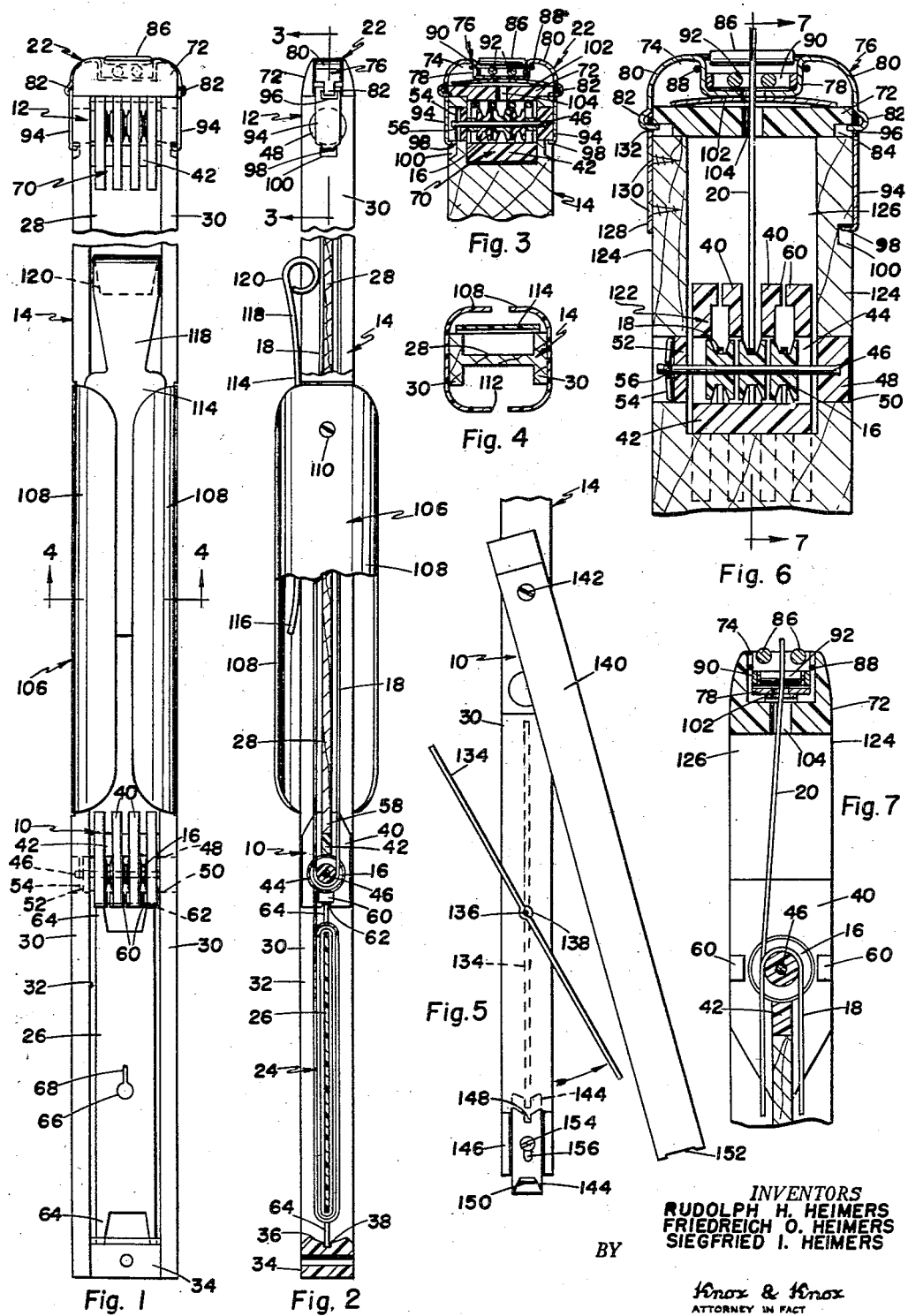

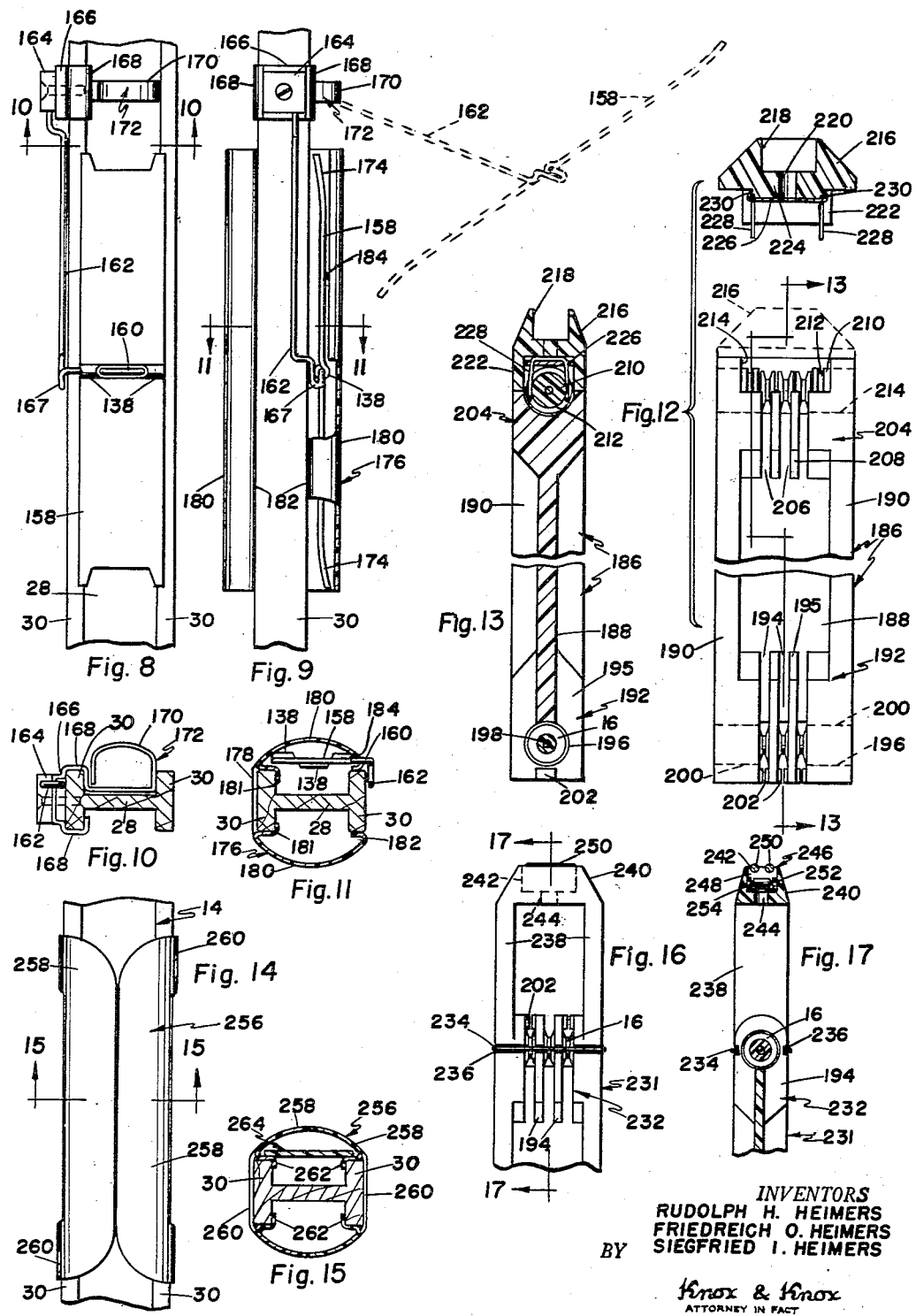

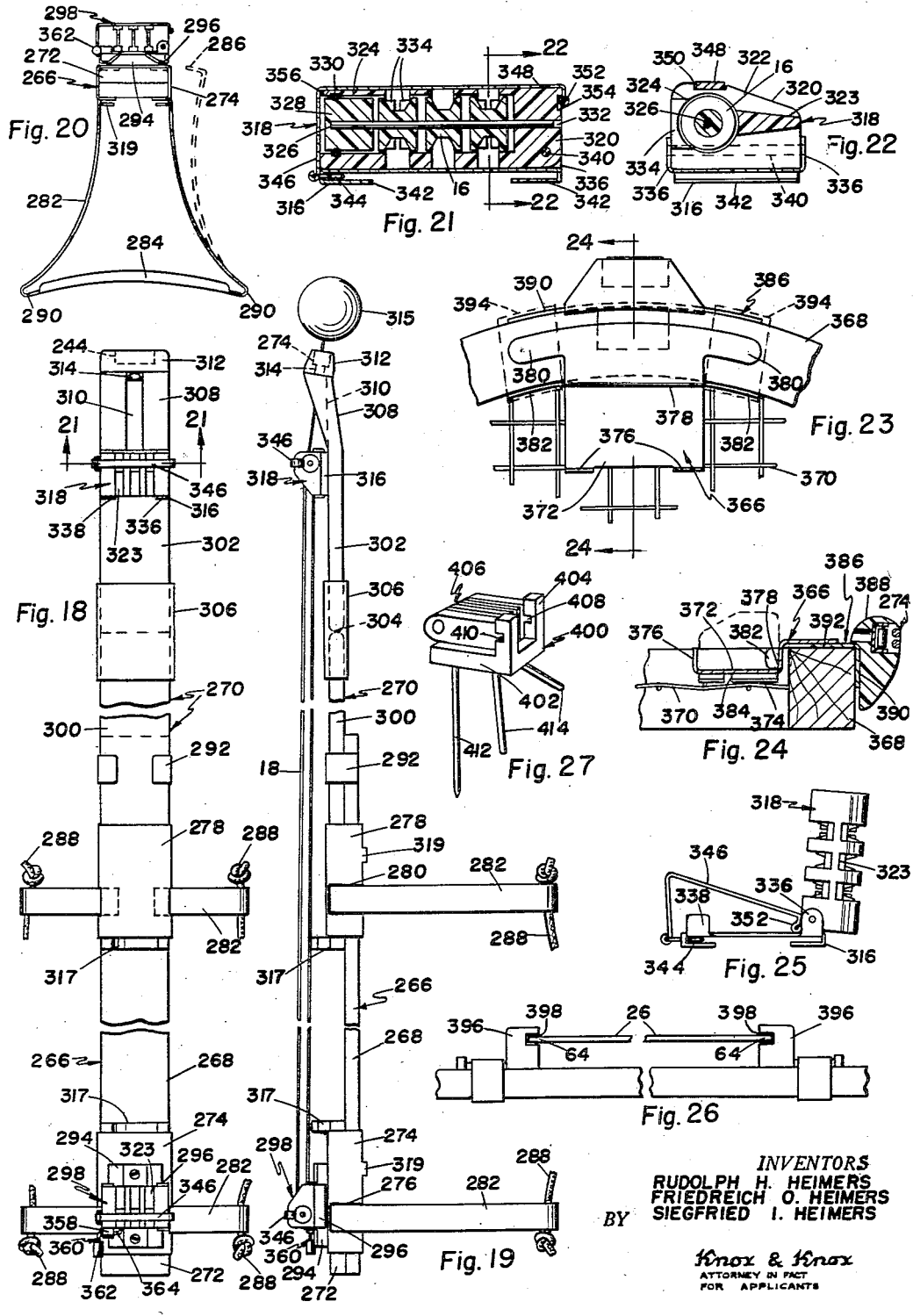

2,806,700

APPARATUS HAVING A CAPTIVE ELEMENT

Rudolph Heinrich Heimers, Friedreich Otoman Heimers, and Siegfried Immanuel Heimers, Palm City, Calif.

Application October 12, 1953, Serial No. 385,532

16 Claims. (Cl. 273—95)

The present invention relates generally to an apparatus having a captive element and more particularly to sporting equipment having a captive member.

The primary object of this invention is to provide an apparatus in which a captive element or member, for example a projectile, ball or other object, may be driven to extreme distances without undue stretching or straining of the resilient linear means to which it is attached, the invention residing mainly in the novel means of mounting said linear means on the device.

Another object of this invention is to provide an apparatus having a captive element in which the pulley mounts and/or guards are so constructed that the resilient linear means, for example an elastic cord, may be threaded or re-threaded easily on spaced pulleys without the use of special threading means, such as a needle or a hook, and the resilient linear means will remain in place without tangling or binding.

Another object of this invention is to provide a captive element apparatus which may be constructed in various forms to suit particular types of sports or games. For example, two multiple pulley blocks may be mounted at opposite ends of a spacer rod or wand to be carried by the player or attached to his body, the length of the wand being determined by the space required between the pulley blocks which in turn determines the length of the resilient linear means and the range of the captive member. The pulley blocks may also be mounted directly on playing apparatus such as a tennis racket or the like, or the pulley blocks may be fitted with suitable brackets and secured to a floor or to the ground surface. In all forms of the device, the arrangement of the pulley blocks and the resilient linear means is unchanged.

Another object of this invention is to provide a captive element apparatus in which excess elastic cord is stored on a spool which is easily accessible and exchangeable and will not interfere with the elastic cord when in use.

Another object of this invention is to provide a captive element apparatus which is easily assembled and dismantled for cleaning, servicing and for oiling the pulleys and spaced rollers of the roller guide means when necessary, their free running being essential to the operation of the device.

Another object of this invention is to provide captive element apparatus having novel friction brake means to arrest the motion of the elastic cord and facilitate handling of the captive ball or other object.

Another object of this invention is to provide an apparatus as aforementioned which is adapted for fabrication from many different materials, so that the choice of material can be according to the dictates of availability and price considerations, the exact sizes and proportions being matters easily determined to suit particular conditions and needs.

Finally, it is an object to provide an apparatus of the aforementioned character which is simple, safe and convenient to operate, and which will give generally efficient and durable service.

With these and other objects definitely in view, this invention consists in the novel construction, combination and arrangement of elements and portions as will be hereinafter fully described in the specification, particularly pointed out in the claims, and illustrated in the drawings which form a material part of this disclosure and wherein similar characters of reference indicate similar or identical elements and portions throughout the specification and throughout the views of the drawings, and in which:

Fig. 1 is a plan view of the basic form of the device, the elastic cord being omitted for clarity.

Fig. 2 is a side elevation view, partially sectioned, with the elastic cord shown in place.

Fig. 3 is a fragmentary sectional view taken on the line 3—3 of Fig. 2.

Fig. 4 is a sectional view taken on the line 4—4 of Fig. 1.

Fig. 5 is a fragmentary side elevation view of a modified form of the device having a rotatable spool for the elastic cord.

Fig. 6 is an enlarged fragmentary sectional view similar to Fig. 3, but showing a modified arrangement of the pulley head.

Fig. 7 is a sectional view taken on the line 7—7 of Fig. 6.

Fig. 8 is a fragmentary plan view showing an alternative method of mounting the rotatable spool.

Fig. 9 is a side elevation view of the structure shown in Fig. 8, also showing a slidable hand grip which was omitted in Fig. 8 for clarity.

Fig. 10 is a sectional view taken on the line 10—10 of Fig. 8.

Fig. 11 is a sectional view taken on the line 11—11 of Fig. 9.

Fig. 12 is a fragmentary exploded view, partially sectioned, of a modified pulley head structure.

Fig. 13 is a sectional view taken on the line 13—13 of Fig. 12.

Fig. 14 is a fragmentary plan view showing a divided slidable hand grip.

Fig. 15 is a sectional view taken on the line 15—15 of Fig. 14.

Fig. 16 is a fragmentary plan view of a modified head pulley block.

Fig. 17 is a sectional view taken on the line 17—17 of Fig. 16.

Fig. 18 is a plan view of a modified form of the device suitable for attachment to the body of a player, the elastic cord being omitted for clarity.

Fig. 19 is a side elevation view of the structure shown in Fig. 18 with the elastic cord shown in place.

Fig. 20 is an end elevation view of the structure shown in Fig. 18.

Fig. 21 is an enlarged partial sectional view taken on the line 21—21 of Fig. 18.

Fig. 22 is a sectional view taken on the line 22—22 of Fig. 21.

Fig. 23 is a fragmentary plan view showing the method of attaching the device to a tennis racket.

Fig. 24 is a sectional view taken on the line 24—24 of Fig. 23.

Fig. 25 is an end elevation view of the pulley block shown in Figs. 18-24, the pulley block being opened for installation of the elastic cord.

Fig. 26 is a fragmentary side elevation view showing a method of storing a reserve spool of elastic cord on any of the forms of the device.

Fig. 27 is a perspective view of a pulley block mounted on a bracket for securing the pulley block to the ground.

Referring now to the drawings, the apparatus comprises, basically, a foot pulley block 10 and a head pulley block assembly 12, which are mounted substantially at opposite ends of a rod or wand 14. The head pulley block assembly 12 and foot pulley block 10 each contain a plurality of freely rotating grooved pulleys 16, and a length of elastic cord 18 is wound around said pulleys progressively, the free end 20 of said elastic cord extending through the roller guide 22 which is a component of the head pulley block 12. The excess elastic cord, indicated by the numeral 24, is stored on a spool 26 which is removably attached to the wand 14.

The wand 14 is an elongated beam-like member, generally I-shaped in cross section and comprising a flat central web 28 and sides 30. At one end of the wand 14, a portion of the web 28 is cut away to provide an opening 32, the end portions of the sides 30 being joined at this end of the wand by a spacer block 34 as shown in Figs. 1 and 2. The spacer block 34 has an angular recess 36 in the inner face thereof as shown in Fig. 2, and the recess 36 is deepened centrally to define a groove 38.

The pulley block 10, which may be machined from a single piece of material, comprises a plurality of parallel spaced plates 40 separated by integral spacer portions 42, the spaced plates extending beyond the spacer portion on opposite sides of the block 10 and defining runways for the elastic cord 24, said plates being disposed longitudinally of the wand 14. Extending through the plates 40 is a bore 44, which accommodates the pulleys 16 these pulleys being rotatably mounted on a shaft 46. One end of the shaft 46 is embedded in a plug 48 which is a push fit in a bore 50 in one of the sides 30. The other end of the shaft 46 passes through a supporting disc 52 fitted in a similar bore in the other side 30 and is retained by a suitable spring clip 54, said shaft having a groove 56 to receive the clip, all said bores being coaxial and substantially of the same diameter, as illustrated in the drawings. The plates 40 have notches 58 at one end to fit over the web 28, the spacer portions 42 acting as stops engaging the web 28 so that the pulley block is held firmly in place. The other ends of the plates 40 are provided with restrictors 60, which are actually thickened portions of the plates and serve to reduce the gap therebetween. These restrictors 60 prevent the elastic cord 18 from inadvertently slipping out of the pulley block, although the elastic cord may be forced through the restricted gap when winding. The ends of the plates 40 adjacent the restrictors 60 are grooved as indicated at 62. The spool 26 is a flat rectangular element having extended prongs 64 at each end. The excess amount of the elastic cord 24 is wound longitudinally around the spool 26 and is retained between the prongs 64. The spool is provided with an opening 66 having a key-hole slot 68, so that the end of the elastic cord may be retained therein. The spool 26 is held in place by inserting the prongs 64 at one end into the groove 62 of the pulley block, while the prongs at the other end are inserted into the groove 38 in the spacer block 34. The spool 26 is sufficiently resilient to permit slight bowing thereof so that the prongs may be snapped into place.

The head pulley block assembly 12 includes a pulley block 70, a portion of the web 28 being removed to receive said pulley block as previously described in connection with the pulley block 10. The pulley block 70 is similar in all respects to the pulley block 10, except that the restrictors 60 are omitted. The end of the pulley block 70 is flush with the end of the wand 14 and is covered by the roller guide 2 which is removably attached thereto. The roller guide 22 comprises a block 72 having a lateral channel 74, as shown in Fig. 3, in which is fitted a mounting bracket 76. This mounting bracket 76 has a central U-shaped portion 78 from which extend a pair of side portions 80, said side portions having looped lugs 82 at the ends thereof. The lugs 82 protrude inwardly and engage sockets 84 in the block 72. A pair of freely rotating spaced rollers 86 are journalled in the U-shaped portion 78 which is encircled by a retaining wire 88. Also fitted in the U-shaped portion 78 is an open rectangular frame 90 in which are journalled a second pair of spaced rollers 92 at right angles to the rollers 86. The roller guide 22 is retained by a pair of retaining clips 94 which have at one end thereof slots 96 to receive the ends of lugs 82. The other ends of the retaining clips 94 are provided with hooks 98 which engage notches 100 in the sides 30 of the wand 14. The mounting bracket 76 is biased outwardly by a leaf spring 102 so that the retaining clips 94 are held firmly in the notches 100, thus holding the roller guide 22 in place. The block 72 is provided with a central opening 104 through which the free end 20 of the elastic cord 18 is passed, the leaf spring 102 and the U-shaped portion 78 having corresponding openings aligned therewith. The free end 20 of the cord as shown in Fig. 6 passes between the pairs of rollers 86 and 92 and is thus free running.

The wand 14 is fitted with a hand grip 106 adjacent the pulley block 10, said hand grip comprising a pair of grip portions 108 which are secured to the sides 30 by screws 110. The grip portions 108 are rolled inwardly over the wand 14, as shown in Fig. 4, a gap 112 being left between the edges thereof to allow installation of the elastic cord. Fitted within the hand grip 106 is a removable and slidable friction brake 114, comprising a flat strip of material having a curved end 116 which is frictionally held between the grip portions 108 and the sides 30. The tongue 118 of the friction brake 114 extending beyond the hand grip is disposed towards the web 28 and has a rolled tip 120 which serves as a manual grip. In its free position the tongue 118 is slightly clear of the web 28 to permit free movement of the elastic cord 18, but may be depressed manually to prevent movement of the elastic cord when it is desired to limit the extension thereof or to retard its movement.

In order to use the device, the elastic cord 18 is wound progressively around the pulleys 16, the free end 20 protruding from the roller guide 22. The object to be used is attached to the free end 20 and the elastic cord is adjusted so that sufficient slack is available in the free end. If, for example, a ball is thrown or struck, the stretching is taken up by the entire length of elastic cord wound around the pulleys. Due to the fact that the wand 14 may be several feet in length, the length of the elastic cord is considerable, thus the ball may travel a great distance without undue stretching of the elastic. On the rebound, the slack is taken up evenly as the elastic cord rolls freely upon the pulleys. In order to facilitate installing the elastic cord, the roller guide 22, the spool 26 and the brake 114 are, of course, removed so that the elastic cord may be threaded easily between the plates 40.

A slightly modified form of the pulley head is illustrated in Figs. 6 and 7. The pulley block 122, which is similar to the pulley block 10 except that the restrictors 60 are omitted adjacent the central pulley only, is installed as previously described. In addition, further restrictors 60 are provided at each side of the central pulley 16 to prevent the elastic cord from leaving the pulley block. However, the sides of the wand are extended, as indicated at 124, beyond the pulley block 122 so that an opening 126 is apparent between said pulley block and the roller guide 22. The roller guide 22 is installed geenrally as previously described except that one of the retaining clips 94 is replaced by a hinge clip 128. This hinge clip 128 is secured to the extended side 124 by screws 130, the upper end of said hinge clip having a slot 132 to receive the lug 82.

A slightly modified form of the spool assembly shown and described in Figs. 1 and 2, is shown in Fig. 5 in which the spool 134 is removably and rotatably mounted on a pin 136 secured to one of the sides 30 of the wand 14, said spool having integrally formed bearing portions 138. The other side of the wand is replaced by a hinged side member 140 pivotally attached to the wand 14 by a screw 142. The side member 140 and the spool 134 are held in place by a slidable lock member 144 mounted on a spacer block 146, all of which are mounted on the wand 14. The lock member 144 has a notch 148 to engage the spool 134 and also has a return folded tab 150 which fits into a recess 152 in the side member 140. The lock member 144 is retained by a screw 154 passing through the slotted hole 156. It will be seen that by releasing the lock member 144 and swinging the side member 140 clear of the spool 134, the spool may be rotated manually to wind the elastic cord thereon.

A further method of mounting a rotatable spool is illustrated in Figs. 8–11. In this particular structure, the spool 158 is rotatably mounted on the transverse shaft portion 160 of an arm 162, said arm being secured in a block 164 which is oscillatably attached to a mounting bracket 166. The arm 162 has a folded portion 167 adjacent the shaft 160 to prevent the spool 158 from binding. The bracket 166 is provided with tabs 168 which are bent to fit around the side 30, one of said tabs being extended across the web 28 and having an upwardly arched portion 170 which constitutes a friction brake 172. This friction brake 172 is manually depressed when required to prevent movement of the elastic cord, the purpose being similar to that described for the friction brake 114. The arm 162 may be swung outwardly to the position shown dotted in Fig. 9 so that the spool 158 may be manually rotated without contacting the wand 30.

The spool 158 is constructed similarly to the spool 134 having the integral bearing portions 138, but the ends of said spool are curved slightly in opposite directions as indicated at 174.

Fitted around the wand 14 is a slidable hand grip 176, shown in Fig. 9, which encloses the spool 158. The hand grip 176 is a unitary piece of material having a flat side 178 and opposed arcuate portions 180 which cover both sides of the wand 14. A portion of the flat side 178 is cut and inwardly bent to form flanges 181 which engage one of the sides 30, while the arcuate portions 180 have inwardly turned edges 182 which rest on the edges of the other side 30. A portion of one edge 182 is cut away as indicated at 184 to clear the shaft 160 so that the hand grip 176 may be slid into position over the spool assembly. The curved ends 174 allow the spool 158 to fit over the flanges 181 as the hand grip is slid into place. The hand grip 176 may, of course, be placed at any position on the wand 14 to obtain a comfortable grip. The mounting bracket 166 is frictionally held on the wand and may also be adjusted longitudinally as required. The hand grip 176 is sufficiently resilient to allow the elastic cord to be forced between the edges 182 and the sides 30 when winding the elastic cord around the pulleys.

A modified structure of the wand is illustrated in Figs. 12 and 13, in which the pulley blocks are constructed integrally with the wand for simplicity. The wand 186 comprises a web 188 and two sides 190 as previously described, and has at one end an integral pulley block 192. This pulley block 192 is formed by cutting a plurality of slots 194 on both sides of the wand to define the plates 195, and providing a bore 196 for the pulleys 16. The pulleys are mounted on a shaft 198 at each end of which is a plug 200, the plugs being press fitted into the bore 196. The open ends of the slots 194 are cut to provide restrictors 202, similar in design and purpose to the restrictors 60.

The other end of the wand 186 has an integral pulley block 204 having a plurality of slots 206 separating the plates 208. The pulleys 16 are mounted on a shaft 198 at each end of which is a plug 210, said plugs having annular grooves 212. The end portions of the plates 208 are cut away approximately in line with the axis of the pulleys 16 to provide sockets 214.

Fitted to the end of the wand 186 is a guide block 216 which also serves as a retainer for the pulley assembly. The guide block 216 has a recess 218 and a central opening 220 through which the elastic cord emerges, said block also having side plates 222 between which is a shoulder 224. Secured to the shoulder 224 is a plate 226 which holds in place a pair of spring clips 228, the ends 230 of said plate being clinched inwardly into the shoulder. When the guide block 216 is fitted to the end of the wand 186, the spring clips 228 engage the grooves 212, as shown in Fig. 13, and hold the pulley assembly in alignment, while the side plates 222 fit into the sockets 214 and enclose the pulleys.

Illustrated in Figs. 16 and 17 is a modification of the wand having integral pulley blocks as shown in Figs. 12 and 13. A similar relationship of structure was shown in Figs. 6 and 7 when compared to Figs. 1 to 4. The wand 231 has an integral pulley block 232, the construction of which is similar to that of the pulley block 192. The upper and lower pulley blocks for wand 231 are the same. However, the restrictors 202 adjacent the central pulley are omitted, the elastic cord and pulleys being retained in position by an elastic band 234 or the like which fits into a groove 236 completely surrounding the wand at the axis of the pulleys. The sides of the wand are extended beyond the pulley block 232 as indicated at 238, and are joined at their ends by an integral guide block 240, said guide block having a recess 242 and a central opening 244.

Press fitted into the recess 242 is a roller assembly 246, comprising a cage 248 in which are mounted a pair of spaced, freely rotatable rollers 250. In the lower portion of the cage 248 is a removable rectangular frame 252 containing a second pair of rollers 254 mounted at right angles to the rollers 250. The arrangement is similar to the structure shown in Figs. 6 and 7 and allows the elastic cord to run freely. This roller assembly 246 is a separate component and may be used with the wand shown in Fig. 12 by inserting the assembly into the recess 218 if desired.

An adjustable hand grip 256, which may be used with the various wands, is shown in Figs. 14 and 15. The hand grip 256, comprises a pair of similar grip portions 258 each of which is a generally semi-cylindrical shell having a flat face 260. Each flat face 260 is cut and inwardly turned to provide a pair of flanges 262 which frictionally engage the side 30 of the wand. The edges of the grip portions 258 are substantially in contact, as shown best in Fig. 14, so that the wand is fully enclosed by the hand grip to prevent the elastic cord from becoming loose and tangled during the rebound action of the device. If desired, a spool of elastic cord may be carried within the hand grip 256 as indicated at 264.

A further modification of the device is shown in Figs. 18–20, this particular structure being suitable for attachment to the body of a player so that his hands are free. The structure includes a telescopic bar 266 comprising a fixed section 268 and a sliding section 270, both of substantially flat material. Attached to one end of the fixed section 268 is a block 272 which is secured by a fixed mounting bracket 274, said mounting bracket having at each side a slot 276. Attached to the sliding section 270 is a sliding bracket 278 which engages the fixed section 268, said sliding bracket having at each side a slot 280. The slots 276 and 280 are shaped to receive a pair of support brackets 282 having curved body engaging portions 284 which rest against the body of the player, usually on the back. The support brackets 282 have inwardly turned ends 286, the ends of one of said support brackets fitting between the block 272 and the cut-out portion of the mounting bracket 274 tightly enough to wedge the support bracket in place. Similarly, the ends of the other support bracket 282 fit between the sliding section 270 and the cut-out portion of the sliding bracket 278. The device is fastened to the player's body by suitable cords 288 which are passed through the looped lower corners 290 of the support brackets 282. The sliding section 270 is aligned by a guide bracket 292 which fits around both portions of the wand and is spaced from the sliding bracket 278 to prevent wobbling of the sliding section. Attached to the mounting bracket 274 is a support block 294 to which is secured a support bracket 296 carrying a pulley block 298.

The sliding section 270 has a lower portion 300, which is slidably attached to the fixed section 268, and an upper portion 302. The lower portion 300 and the upper portion 302 have abutting rounded ends 304 and are joined by a sleeve 306 of slightly flexible material such as hard rubber or the like. Thus any inadvertent blows on the upper portion 302, such as collisions with overhead obstructions, are absorbed by the sleeve 306. The end of the upper portion 302 is shaped to form a guide head 308 having therein a longitudinal channel 310. Attached to the end of the guide head 308 is a guide block 312 in which is secured a roller assembly 246, as shown in Fig. 17, said guide block having a central opening 314 aligned with the channel 310 so that the elastic cord may pass freely through the roller assembly, a ball 315 being shown attached to the end 20 as an example. Secured to the upper portion 302 adjacent the guide head 308 is a support bracket 316 carrying a pulley block 318, thus the elastic cord 18 is wound between the pulley blocks 298 and 318.

The pulley block 318, shown in Figs. 21 and 22, comprises a block 320 having a plurality of plates 322 joined by spacers 323 and a transverse bore 324. It should be noted that the spacers 323 taper to provide ample clearance for the elastic cord. The pulleys 16 are mounted on a shaft 326 at one end of which is a plug 328, having thereon a split ring 330 to secure said plug frictionally in the bore 324. The free end of the shaft 326 fits into a reduced diameter bore 332. All of the slots between the plates 322, except the central one, are provided with restrictors 334, and it will be evident that the general construction of the pulley block thus far is similar to that previously described.

The support bracket 316 has at one end a pair of hinge tabs 336 and at the other end a pair of aligning tabs 338, as shown in Fig. 25. The block 318 is pivotally mounted between said hinge tabs by a pin 340. The support bracket 316 also has return folded ends 342, one of said ends containing a spring loop 344 to which is pivotally attached a retaining clip 346. The retaining clip 346 is substantially L-shaped, the upper arm 348 thereof fitting into a groove 350 cut in the upper surface of the block 318. The free end of the retaining clip 346 is turned downwardly over the end of the block 318 and has a rolled tip 352 which fits into a notch 354 in said block, said retaining clip being substantially resilient. The opposite end of the block 318 also has a notch 356 so that the retaining clip may be forced inwardly to release the rolled tip 352.

After releasing the retaining clip 346, the block 318 may be pivoted upwardly to facilitate winding of the elastic cord as shown in Fig. 25. The retaining clip is forced downwardly so that the rolled tip 352 wedges against the base of the block 318, said retaining clip being held by the tension of the spring loop 344.

The pulley block 298 in Fig. 18 is similar in construction to the pulley block 318 and is pivotally mounted in a similar manner on the support bracket 296. This support bracket 296 has a rolled tab 358 in place of one of the aligning tabs 338 used on the support bracket 316, said rolled tab providing a bearing for the friction brake 360. The friction brake 360 has a handle 362 and an opposed pressure arm 364, said pressure arm extending into the pulley block 298 beneath one of the pulleys 16. Thus by depressing the handle 362, the pressure arm 364 is brought to bear against the pulley 16 and the elastic cord therein, thus stopping the motion of the elastic cord. The friction brake 360 may be actuated remotely if required by a suitable cord attached to the handle 362.

The pulley block 318 may be attached to a tennis racket by means of a bracket 366 as shown in Figs. 23 and 24, said bracket being attached to the upper portion of the frame 368 of the racket and extending slightly over the strings 370. The bracket 366 includes a platform 372 having return folded ends 374 and upwardly turned tabs 376 at one edge thereof, the arrangement being similar to that of the support bracket 316. The remaining edge of the platform 372 has an upwardly bent back support 378, which is further bent horizontally and extended to provide a pair of tongues 380. The back support 378 is also extended to provide a pair of tongues 382 which are curved to fit inside the frame 368. The pulley block 318 rests on the platform 372 and is pivotally mounted between the back support 378 and one of the tabs 376, the arrangement being similar to that shown in Figs. 21 and 22. The folded ends 374 of the platform 372 reinforce the edges of the platform and provide a spacer to allow sufficient space in which the guide block may be secured to the platform. Notches 384 in the folded ends 374 facilitate binding the bracket to the strings 370 for additional rigidity if necessary.

A further bracket 386 is provided to hold a guide block 388 in which is fitted roller assembly 274. The bracket 386 comprises a back plate 390 having an extended tab 392 which rests on the frame 368 beneath the bracket 366. Both the bracket 366 and the bracket 386 are secured to the racket by suitable tape or binding 394.

Another pulley block may be secured to the extreme end of the handle of the tennis racket to complete the installation, the support bracket used being suitably bound to the handle.

In the event that a spare spool of elastic cord is required, the spool may be stored on the various forms of the device by using a pair of retaining blocks 396 which are bound to the wand or handle in a convenient position. The retaining blocks 396 have notches 398 to receive the prongs 64 of the spool 26 which is ideally suited for this arrangement.

For certain purposes, excessive extension of the elastic cord may be desirable, thus the pulley blocks must be a considerable distance apart. In this instance, the pulley blocks may be attached to supports which may be secured to the ground, a particular support being the tripod 400 shown in Fig. 27. The tripod 400 comprises a block 402 having a pair of spaced uprights 404. A pulley block 406 is attached to the tripod, said pulley block having extended lugs 408 which engage corresponding notches 410 in the uprights 404. The pulley block 406 is otherwise similar to the pulley block 10 in general construction. The block 402 is fitted with a spike 412 and suitable supporting legs 414 so that the device may be embedded in the ground at the required position. This particular arrangement is suitable for practice golf where the ball is to be driven a considerable distance.

The telescopic bar 266, shown in Figs. 18-20, may be used together with a tennis racket or with certain of the wands previously described. For this purpose a pair of supports 317 are fitted to the device, one of said supports being on the fixed section 268 and the other being attached to the end of the sliding section 270. A tennis racket or one of the wands may be placed on the supports 317 and secured by elastic bands or the like, the ends of which may be secured on the hooks 319 formed integrally with the mounting bracket 274 and the sliding bracket 278. The pulley blocks 298 and 318 are, of course, omitted from the bar 266, in this case, the tennis racket or the wand having the necessary pulley and elastic cord assembly thereon.

It will be evident that various sizes of the device will be suitable for specific games, the size of the elastic cord also being determined by the particular game to be played. Besides being suitable for many types of ball games, the device may also be used for other games such as hockey, the puck being captive in this instance.

For casting purposes in the fishing sport, the resilient linear means can be united with one or more bait leaders, lures or hooks. In this use of my device, the end of the linear means which is attached to the lure or hook could, if desired, be made of nylon or plastic cord. This cord could be of any length found desirable in use.

It is within the scope of my invention to vary the number of pulleys in each block, as desired, according to the requirements of range of the captive member and price of the finished apparatus. One pulley in each block would achieve the purpose of my invention and it is obvious that the length of the elastic cord and consequent range of the captive member would be less, as well as being less expensive to manufacture. On the other hand, the greatest number of pulleys would provide for the greatest maximum range of the captive member and the particular number of pulleys would be limited only by the size and strength of the elastic or resilient linear means.

In the models with greatest maximum range of the captive member, the device is intended to permit a captive ball to be used with almost as much freedom as a free ball, due to the excessive extension possible of the elastic cord. The stretching is spread progressively toward the ball and retractably toward the spool along the considerable length of elastic cord which rolls freely depending on the distance around the pulleys. It will be understood that by using a greater number of pulleys in each block a smoother and easier handling of the ball is achieved providing the ball and string are of the same size and weight. In all forms of the structure the pulleys are readily removable for lubrication and cleaning to ensure their free rotation.

The operation of this invention will be clearly comprehended from a consideration of the foregoing description of the mechanical details thereof, taken in connection with the drawings and the above recited objects. It will be obvious that all said objects are amply achieved by this invention.

It is understood that minor variation from the form of the invention disclosed herein may be made without departure from the spirit and scope of the invention, and that the specification and drawings are to be considered as merely illustrative rather than limiting.

We claim:

1. Apparatus including a captive element, a pair of pulley blocks each having a shaft mounted therein, a plurality of freely rotating pulleys mounted on said shafts, a length of elastic cord wound serially around said pulleys and a portion of said pulley blocks in adjacent loops, one end of said elastic cord being attached to said captive element, said pulley blocks having open slots aligned with said pulleys for threading of the elastic cord, roller means adjacent one of said pulley blocks to guide said elastic cord, a resilient manually operated frictional brake engageable with said elastic cord, and means for holding said pulley blocks in spaced relation, and means adjacent one of said pulley blocks for securement of the other end of said elastic cord.

2. Apparatus including a captive element, a pair of pulley blocks each having a shaft mounted therein, a plurality of freely rotating pulleys mounted on said shafts, a length of elastic cord wound serially around said pulleys and a portion of said pulley blocks in adjacent loops, one end of said elastic cord being attached to said captive element, said pulley blocks having open slots aligned with said pulleys for threading of the elastic cord, certain of said slots having restricted portions, roller means adjacent one of said pulley blocks to guide said elastic cord, a resilient manually operated frictional brake engageable with said elastic cord, and means for holding said pulley blocks in spaced relation, and means adjacent one of said pulley blocks for securement of the other end of said elastic cord.

3. Apparatus including a captive element, a pair of pulley blocks each having a shaft mounted therein, a plurality of freely rotating pulleys mounted on said shaft, a length of elastic cord wound serially around said pulleys and a portion of said pulley blocks in adjacent loops, one end of said elastic cord being attached to a captive element, said pulley blocks having open slots aligned with said pulleys to facilitate threading of the elastic cord, roller means adjacent one of said pulley blocks to guide said elastic cord, a resilient manually operated frictional brake engageable with said elastic cord, support means holding said pulley blocks in spaced relation, and an elastic cord storage spool removably attached to said support means and being aligned with said pulley blocks.

4. Apparatus including a captive element, a rigid supporting member, pulley blocks at each end of said member, said pulley blocks each having a shaft mounted therein, a plurality of freely rotating pulleys mounted on said shaft, and open slots aligned with said pulleys, a length of elastic cord wound serially around said pulleys and extending over a portion of said pulley blocks in adjacent loops, roller guide means detachably secured to said supporting member and adjacent one of said pulley blocks, said elastic cord extending through said roller guide means and terminally secured to said captive element, said supporting member having an elongated opening extending longitudinally thereof, a storage spool comprising an elongated flat element removably fitted in said opening, the other end of said elastic cord being fastened to said spool.

5. Apparatus including a captive element, a pair of pulley blocks each comprising a plurality of parallel spaced opposed plates, a spacer member on which one end of each of said plates is fixed, a plurality of pulleys having grooves to receive a linear element, means for mounting said pulleys on said blocks for free rotation and with said grooves disposed between said plates, said plates having portions at the other ends thereof extending beyond the corresponding pulleys and extending in the direction of the other block and also extending on opposite sides of each block to define runways, a length of elastic cord wound serially around said pulleys in adjacent loops and extending through said runways, one end of said elastic cord being attached to said captive element, said means for mounting comprising an axis member on which said pulleys are mounted, said plates having bores coaxial with said axis member to accommodate the pulleys, and means for terminally mounting said axis member in fixed relation to said pulley block, an elongated rigid member constituting means for holding said pulley blocks in spaced relation, said rigid member having bores through the sides thereof and coaxial with and communicating with the first mentioned bores and means for securement of the other end of said elastic cord.

6. Apparatus including a captive element, a pair of pulley blocks each comprising a plurality of parallel spaced opposed plates, a spacer member on which one end of each of said plates is fixed, a plurality of pulleys having grooves to receive a linear element, means for mounting said pulleys on said blocks for free rotation and with said grooves disposed between said plates, said plates having portions at the other ends thereof extending beyond the corresponding pulleys and extending in the direction of the other block and also extending on opposite sides of each block to define runways, a length of elastic cord wound serially around said pulleys in adjacent loops and extending through said runways, one end of said elastic cord being attached to said captive element, said means for mounting comprising an axis member on which said pulleys are mounted, said plates having bores coaxial with said axis member to accommodate the pulleys, and means for terminally mounting said axis member in fixed relation to said pulley block and coaxially of said bores, a rigid support member fixed between said pulley blocks and holding the same in spaced relation, said last mentioned means comprising sides on said support member and extending on either side of said pulley blocks, and said sides having bores coaxial with and communicating with the first mentioned bores.

7. Apparatus including a captive element, a pair of pulley blocks each comprising a plurality of parallel spaced opposed plates, a spacer member on which one end of each of said plates is fixed, a plurality of pulleys, means for mounting said pulleys between said plates for free rotation, said plates of each block having portions at the other ends thereof extending beyond the corresponding pulleys in the direction of the other block, a length of elastic cord wound serially around said pulleys in adjacent loops, said plates also extending on opposite sides of the spacer member and defining therebetween runways for said elastic cord on opposite sides of said spacer member, and the corresponding runways of said pulley blocks being aligned, one end of said elastic cord being attached to said captive element, said means for mounting comprising an axis member on which said pulleys are mounted, said plates having bores coaxial with said axis member to accommodate the pulleys, and means for terminally mounting said axis member in fixed relation to said pulley block and coaxially of said bores, a rigid support member fixed between said pulley blocks and holding the same in spaced relation, said support member having sides extending on either side of said pulley blocks, said last mentioned means comprising said sides.

8. Apparatus including a captive element, a pair of pulley blocks each comprising a plurality of parallel spaced opposed plates, a spacer member on which one end of each of said plates is fixed, a plurality of pulleys having grooves to receive a linear element, means for mounting said pulleys on said blocks for free rotation and with said grooves disposed between said plates, said plates having portions at the other ends thereof extending beyond the corresponding pulleys and extending in the direction of the other block and also extending on opposite sides of each block to define runways, a length of elastic cord wound serially around said pulleys in adjacent loops and extending through said runways, one end of said elastic cord being attached to said captive element, said means for mounting comprising an axis member on which said pulleys are mounted, and means for terminally mounting said axis member in fixed relation to said pulley block, means for holding said pulley blocks in spaced relation, and means for securement of the other end of said elastic cord.

9. Apparatus according to claim 8 and wherein said means for holding is an elongated supporting member, a pivoted arm longitudinally adjustably mounted on said supporting member, said arm having a shaft portion, a spool mounted on said shaft portion, said spool being rotatable on said shaft when said arm is swung outwardly from the supporting member.

10. Apparatus according to claim 8 and wherein said means for holding is an elongated supporting member, a pivoted arm longitudinally adjustably mounted on said supporting member, said arm having a shaft portion, a spool mounted on said shaft portion, said spool being rotatable on said shaft when said arm is swung outwardly from the supporting member, a hand grip slidably attached to said supporting member, said hand grip having a slot to accommodate said shaft, whereby said spool is enclosed in said hand grip.

11. Apparatus according to claim 10 wherein said hand grip comprises a pair of individual portions spaced to facilitate threading of the elastic cord.

12. Apparatus according to claim 8 wherein the last mentioned means is a spool and said means for holding the said pulley blocks has an elongated opening therein, said spool being an elongated substantially flat element, said means for holding having a portion hinged for removal of said spool, and lock means for holding said spool and said portion stationary.

13. Apparatus according to claim 8 wherein said means for holding is an elongated member, and the last mentioned means is a spool removably attached to said member and a hand grip longitudinally slidably mounted on said member.

14. Apparatus according to claim 8 wherein said means for holding is an elongated support member, said pulley blocks being unitary with said support member, and said means for mounting including an elastic band transversely surrounding said support member in the plane of said axis member, whereby said axis member and the corresponding pulleys are removably held in place.

15. Apparatus according to claim 8 wherein said means for holding is an elongated supporting member, and a hand grip attached to said supporting member, said hand grip being longitudinally slidable on said supporting member.

16. Apparatus according to claim 8 wherein said means for holding is an elongated supporting member having an opening extending longitudinally thereof and said spool is rotatably mounted in said opening, a portion of the side of said supporting member being hinged for removal of said spool, and lock means for holding said spool and said portion stationary.

References Cited in the file of this patent

UNITED STATES PATENTS

| | | |
|---|---|---|
| 2,094,536 | Heimers | Sept. 28, 1937 |
| 2,110,084 | Heimers | Mar. 1, 1938 |
| 2,128,610 | Heimers | Aug. 30, 1938 |
| 2,181,979 | Schaeffer | Dec. 5, 1939 |

FOREIGN PATENTS

| | | |
|---|---|---|
| 49,406 | Denmark | Oct. 15, 1934 |